United States Patent
Chen

(10) Patent No.: US 9,473,350 B2
(45) Date of Patent: Oct. 18, 2016

(54) PROTECTING A LABEL SWITCHED PATH EGRESS WITHOUT USING DOWNSTREAM LABELS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 40 days.

(21) Appl. No.: 14/498,159

(22) Filed: Sep. 26, 2014

(65) Prior Publication Data
US 2015/0085639 A1    Mar. 26, 2015

Related U.S. Application Data

(60) Provisional application No. 61/883,006, filed on Sep. 26, 2013.

(51) Int. Cl.
| | |
|---|---|
| *H04L 12/26* | (2006.01) |
| *H04L 12/28* | (2006.01) |
| *H04L 12/24* | (2006.01) |
| *H04L 12/723* | (2013.01) |
| *H04L 12/707* | (2013.01) |
| *H04L 12/721* | (2013.01) |

(52) U.S. Cl.
CPC ......... *H04L 41/0668* (2013.01); *H04L 45/22* (2013.01); *H04L 45/50* (2013.01); *H04L 45/38* (2013.01)

(58) Field of Classification Search
CPC ....... H04L 45/02; H04L 45/04; H04L 45/50; H04L 45/28; H04L 45/34
See application file for complete search history.

(56) References Cited

U.S. PATENT DOCUMENTS

| 8,549,176 B2* | 10/2013 | Vasseur | H04L 45/00 370/389 |
| 2010/0008222 A1* | 1/2010 | Le Roux | H04L 45/02 370/228 |

(Continued)

OTHER PUBLICATIONS

Chen, et al., "Extensions to RSVP-TE for P2MP LSP Egress Local Protection," draft-chen-mpls-p2mp-egress-protection-09.txt, May 28, 2013, 14 pages.

(Continued)

*Primary Examiner* — Melanie Jagannathan
(74) *Attorney, Agent, or Firm* — Conley Rose, P.C.; Grant Rodolph; William H. Dietrich

(57) ABSTRACT

A computer program product comprising computer executable instructions stored on a non-transitory computer readable medium such that when executed by a processor cause a network element to protect a label switched network against egress node failure by receiving a primary service label and a backup service label from an upstream node in the network, receiving data traffic comprising the primary service label from the upstream node for transmitting to a downstream node in the network, determining a status of a primary egress node in the network, the primary egress node being associated with a primary label switching path, forwarding the data traffic according to a primary label switching path when the primary egress node is operating properly, and replacing the primary service label with the backup service label and forwarding the data traffic according to a backup label switching path when the primary egress node has failed.

13 Claims, 4 Drawing Sheets

(56) References Cited

U.S. PATENT DOCUMENTS

2012/0092986 A1* 4/2012 Chen ............... H04L 45/22
370/228
2013/0016605 A1* 1/2013 Chen ............... H04L 45/02
370/221

OTHER PUBLICATIONS

Chen, et al., "Extensions to RSVP-TE for LSP Egress Local Protection," draft-ietf-mpls-rsvp-egress-protection-02.txt, Jul. 30, 2014, 16 pages.
Bradner, "Key Words for use in RFCs to Indicate Requirement Levels," RFC 2119, Mar. 1997, 3 pages.
Narten, "Assigning Experimental and Testing Numbers Considered Useful," RFC 3692, Jan. 2004, 7 pages.
Braden, Ed., et al., "Resource ReSerVation Protocol (RSVP)—Version 1 Functional Specification," RFC 2205, Sep. 1997, 112 pages.
Rosen, et al., "Multiprotocol Label Switching Architecture," RFC 3031, Jan. 2001, 61 pages.
Awduche, et al., "RSVP-TE: Extensions to RSVP for LSP Tunnels," RFC 3209, Dec. 2001, 61 pages.
Berger, et al., Generalized Multi-Protocol Label Switching (GMPLS) Signaling Resource ReserVation Protocol-Traffic Engineering (RSVP-TE) Extensions, RFC 3473, Jan. 2003, 42 pages.
Pan, Ed. et al., "Fast Reroute Extensions to RSVP-TE or LSP Tunnels," RFC 4090, May 2005, 38 pages.
Aggarwal., Ed. et al., "Extensions to Resource Reservation Protocol—Traffic Engineering (RSVP-TE) for Point-to-Multipoint TE Label Switched Paths (LSPs)," RFC 4875, May 2007, 53 pages.
Aggarwal., et al., "MPLS Upstream Label Assignment and Context-Specific Label Space," RFC 5331, Aug. 2008, 13 pages.
Aggarwal., et al., "Advertising a Router's Local Addresses in OSPF Traffic Engineering (TE) Extensions," RFC 5786, Mar. 2010, 7 pages.
Le Roux, et al., "P2MP MPLS-TE Fast Reroute with P2MP Bypass Tunnels," draft-ietf-mpls-p2mp-te-bypass-02.txt, Mar. 2008, 14 pages.
Yasukawa, Ed., "Signaling Requirements for Point-to-Multipoint Traffic-Engineered MPLS Label Switched Paths (LSPs)," RFC 4461, Apr. 2006, 30 pages.

* cited by examiner

PROTECTING A LABEL SWITCHED PATH EGRESS WITHOUT USING DOWNSTREAM LABELS

CROSS-REFERENCE TO RELATED APPLICATIONS

The present application claims priority to U.S. Provisional Patent Application 61/883,006, filed on Sep. 26, 2013 by Huaimo Chen, and entitled "Protecting an LSP Egress Without Using Downstream Labels," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a label switched network, data packets are forwarded according to a preset path from a source to a destination. The preset path is defined by a plurality of labels that indicate links or hops between routers in the network. Because the path is preset, each router in the network is not be required to compute a path and create a forwarding entry prior to forwarding the data packets. Accordingly, each router may only maintain information on preset paths that have been established through the router. In some cases, a router may not know if another router downstream in the preset path has failed and a new path should be used. As such, a method of protecting the network against downstream failures is desirable.

SUMMARY

In one embodiment, the disclosure includes a method implemented in an internal node in a network comprising receiving a control message from an ingress node comprising a primary service label associated with a primary egress node and a primary label switched path (LSP) and a backup service label associated with a backup egress node and a backup LSP, establishing a bidirectional forwarding detection (BFD) session with the primary egress node, wherein the BFD session indicates a status of the primary egress node, forwarding data traffic received from an upstream node to the primary egress node according to the primary LSP when the BFD session indicates that the primary egress node is functioning properly, wherein the data traffic comprises the primary service label, forwarding data traffic received from the upstream node to the backup egress node according to the backup LSP when the BFD session indicates that the primary egress node is not functioning properly, and replacing the primary service label on the data traffic with the backup service label when the data traffic is forwarded to the backup egress node according to the backup LSP.

In another embodiment, the disclosure includes a network element comprising a receiver configured to receive a primary service label and a backup service label in a label switched network, and receive a data flow from an upstream node in the network, wherein the data flow is associated with the primary service label. The network element further comprises a processor coupled to the receiver and configured to establish a single-hop BFD session with a primary egress node in the network, forward the data flow to the primary egress node when the BFD session indicates the primary egress node is functioning, associate the data flow with the backup service label when the BFD session indicates the primary egress node has failed, and forward the data flow to a backup egress node. The network element further comprises a transmitter coupled to the processor and configured to transmit the data flow to a downstream node in the network in response to a determination by the processor of a location for transmitting the data flow.

In yet another embodiment, the disclosure includes a computer program product comprising computer executable instructions stored on a non-transitory computer readable medium such that when executed by a processor cause a network element to protect a label switched network against egress node failure by, receiving a primary service label and a backup service label from an upstream node in the network, receiving data traffic comprising the primary service label from the upstream node for transmitting to a downstream node in the network, determining a status of a primary egress node in the network that is associated with a primary LSP, forwarding the data traffic according to a primary LSP when the primary egress node is operating properly, and replacing the primary service label with the backup service label and forwarding the data traffic according to a backup LSP when the primary egress node has failed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a protection scheme for protecting a label switched network against a failure of an egress node in a primary LSP. The protection scheme facilitates an internal node in the network that immediately precedes the egress node to locally protect against a failure of the egress node. The local protection enables the internal node to switch data traffic to a backup egress node. Such protection enables the network to recover rapidly from a failure of the egress node by replacing a primary label on the data traffic with a backup label before transmitting the data traffic to the backup egress node. The protection scheme discussed herein are also discussed in Internet Engineering Task Force (IETF) documents draft-chen-mpls-p2mp-egress-protection-09 and draft-ietf-mpls-rsvp-egress-protection-02, both of which are incorporated by reference as if completely reproduced herein.

Figure 1:
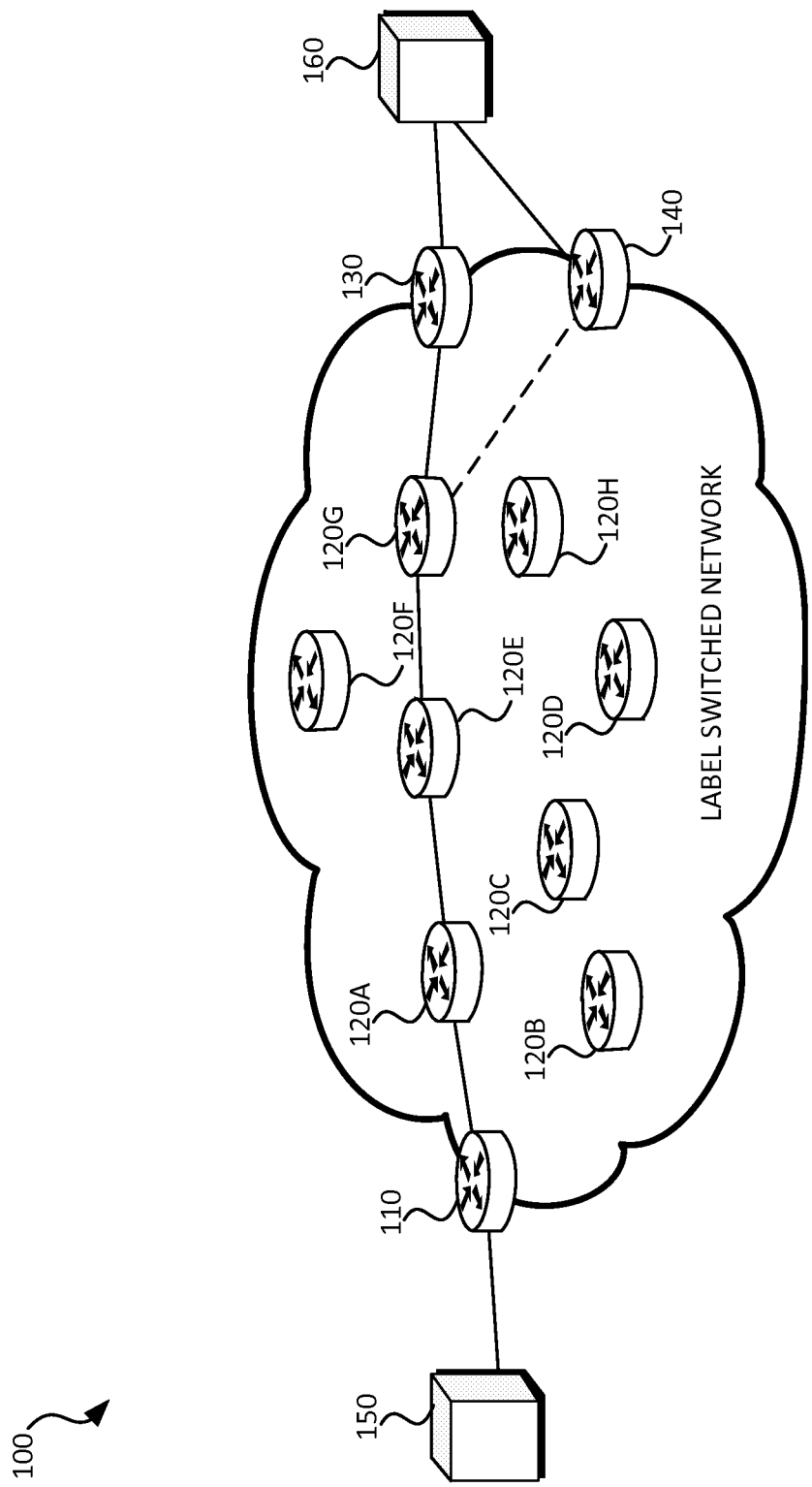
FIG. 1 is a diagram of an embodiment of a label switched network.

FIG. 1 is a diagram of an embodiment of a label switched network 100. Network 100 comprises an ingress node 110, one or more internal nodes 120, a primary egress node 130, a backup egress node 140, and in some embodiments is coupled to a source 150, and a destination 160. Network 100 may in some embodiments be a multiprotocol label switching (MPLS) network. A path through network 100 is referred to herein as a LSP and may be a point-to-point (P2P) LSP, or a point-to-multipoint (P2MP) LSP. Ingress node 110 communicates with source 150, and as such, transports data (e.g., data packets of a data flow) between source 150 and network 100. Source 150 may be a server, a domain, a network (e.g., an Internet Protocol (IP) network), a router, a gateway, network element, a personal computer (PC), and/or any other device capable of communicating with ingress node 110 to transmit data for transport through network 100. Ingress node 110 is coupled to primary egress node 130 and/or backup egress node 140 via one or more internal nodes 120. Accordingly, each internal node 120 communicates with other internal nodes 120, ingress node 110, primary egress node 130, and/or backup egress node 140. Primary egress node 130 and/or backup egress node 140 communicates with destination 160, and as such, transports data (e.g., data packets of a data flow) between network 100 and destination 160. Destination 160 may be a server, a domain, a network (e.g., an IP network), a router, a gateway, network element, a PC, and/or any other device capable of communicating with primary egress node 130 and/or backup egress node 140 to receive data transported through network 100.

In some embodiments, the internal nodes 120 are label switched routers (LSRs) that are configured to modify or update labels on data packets transported through network 100. Further, in some embodiments, ingress node 110, primary egress node 130, and/or backup egress node 140 are label edge routers (LERs) that are configured to insert and/or remove labels on data packets being transported from source 150 to destination 160 through network 100.

Figure 2:
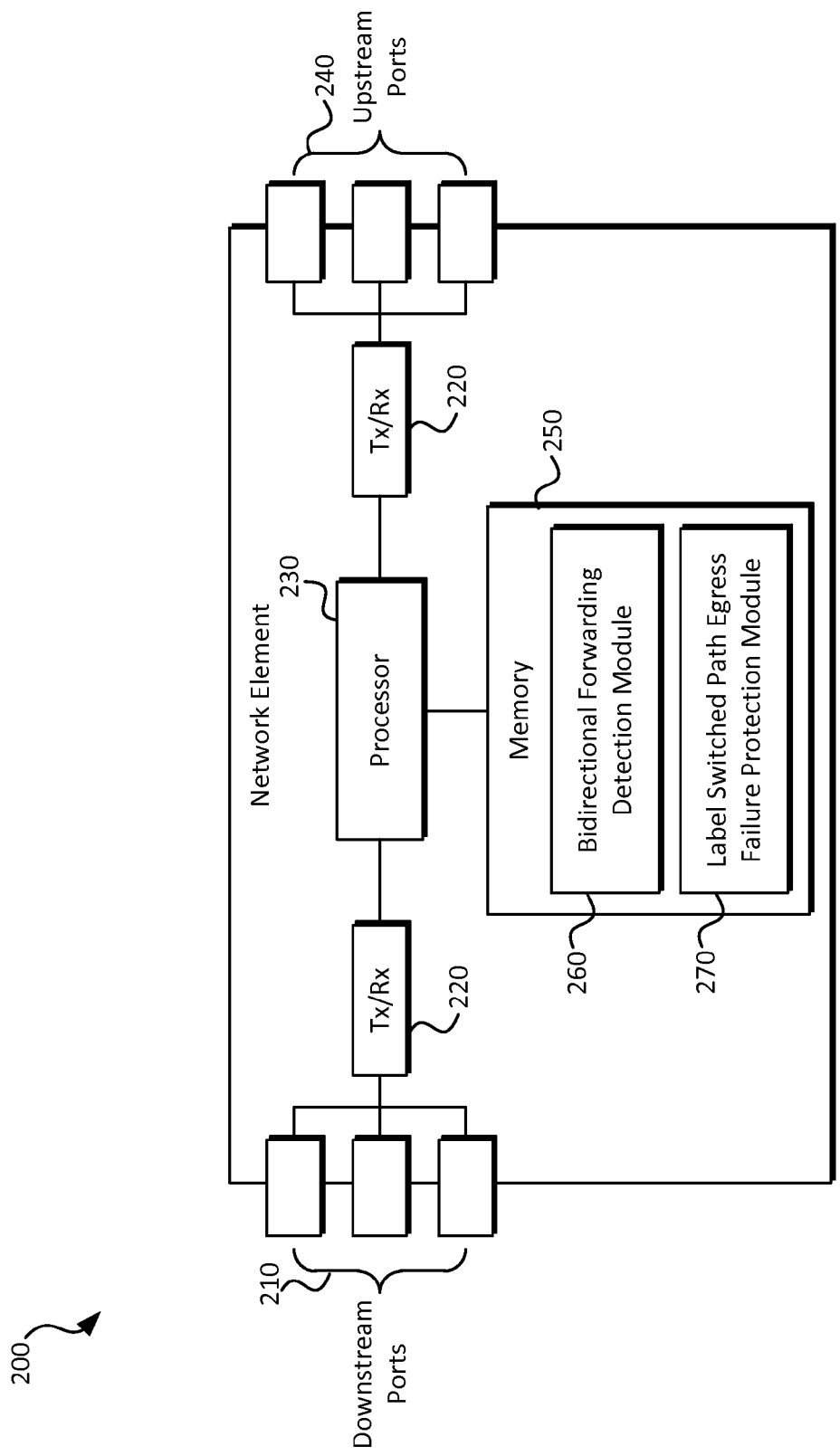
FIG. 2 is a schematic diagram of an embodiment of a network element.

At least some of the features/methods described in this disclosure are implemented in a network element. For instance, the features/methods of this disclosure may be implemented using hardware, firmware, and/or software installed to run on hardware. FIG. 2 is a schematic diagram of an embodiment of a network element 200 that may be used to transport and process traffic through at least a portion of a network, such as network 100, shown in FIG. 1. The network element 200 is any device (e.g., an access point, an access point station, a router, a switch, a gateway, a bridge, a server, a client, a user-equipment, a mobile communications device, etc.) which transports data through a network, system, and/or domain. Moreover, the terms network element, network node, network component, network module, network controller, and/or similar terms may be interchangeably used to generally describe a network device and do not have a particular or special meaning unless otherwise specifically stated and/or claimed within the disclosure. For example, network element 200 may be incorporated within any of ingress node 110, internal nodes 120, primary egress node 130, backup egress node 140, source 150, and/or destination 160, each shown in FIG. 1.

The network element 200 comprises one or more downstream ports 210 coupled to a transceiver (Tx/Rx) 220, which comprise transmitters, receivers, or combinations thereof. The Tx/Rx 220 transmits and/or receives frames from other network nodes via the downstream ports 210. Similarly, the network element 200 comprises another Tx/Rx 220 coupled to a plurality of upstream ports 240, wherein the Tx/Rx 220 transmits and/or receives frames from other nodes via the upstream ports 240. The downstream ports 210 and/or the upstream ports 240 include electrical and/or optical transmitting and/or receiving components. In another embodiment, the network element 200 comprises one or more antennas coupled to the Tx/Rx 220. The Tx/Rx 220 transmits and/or receives data (e.g., packets) from other network elements via wired or wireless connections, depending on the embodiment.

A processor 230 is coupled to the Tx/Rx 220 and is configured to process the frames and/or determine to which nodes to send (e.g., transmit) the packets. In an embodiment, the processor 230 comprises one or more multi-core processors and/or memory modules 250, which function as data stores, buffers, etc. The processor 230 is implemented as a general processor or as part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 is configured to communicate and/or process multi-destination frames.

FIG. 2 illustrates that a memory module 250 is coupled to the processor 230 and is a non-transitory medium configured to store various types of data and/or instructions. Memory module 250 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 250 is used to house the instructions for carrying out the various embodiments described herein. In one embodiment, the memory module 250 comprises a BFD module 260 which is implemented via execution by the processor 230. In an alternate embodiment, the processor 230 comprises the BFD module 260. In one embodiment, the BFD module 260 is implemented according to embodiments of the present disclosure to detect a failure of another network element and/or network node in a network shared with network element 200. For example, BFD module 260 may be configured to identify a failure of the other network element due to not receiving a response to a demand transmitted to the other network element and/or not receiving a periodical communication from the other network element. The memory module 250 further comprises a LSP egress failure protection module 270 which is implemented via execution by processor 230. In an alternative embodiment, the processor 230 comprises the LSP egress failure protection module 270. In one embodiment, the LSP egress failure protection module 270 is implemented to protect the network from a failure of a network element serving as a primary egress node in the network (e.g., primary egress node 130). LSP egress failure protection module 270 protects the network by rerouting data traffic to a backup network element and/or backup egress node in the network (e.g., backup egress node 140) when BFD module 260 indicates that the other network element that is serving as a primary egress node has failed and/or is not functioning properly. Rerouting the traffic comprises LSP egress failure protection module 270 replacing a primary service label on the data traffic with a backup service label and transmitting the data traffic to the backup network element and/or backup egress node. In an alternate embodiment, BFD module 260 and LSP egress failure protection module 270 may be implemented on different network elements (NEs) or across a plurality of NEs.

It is understood that by programming and/or loading executable instructions onto the network element 200, at least one of the processors 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
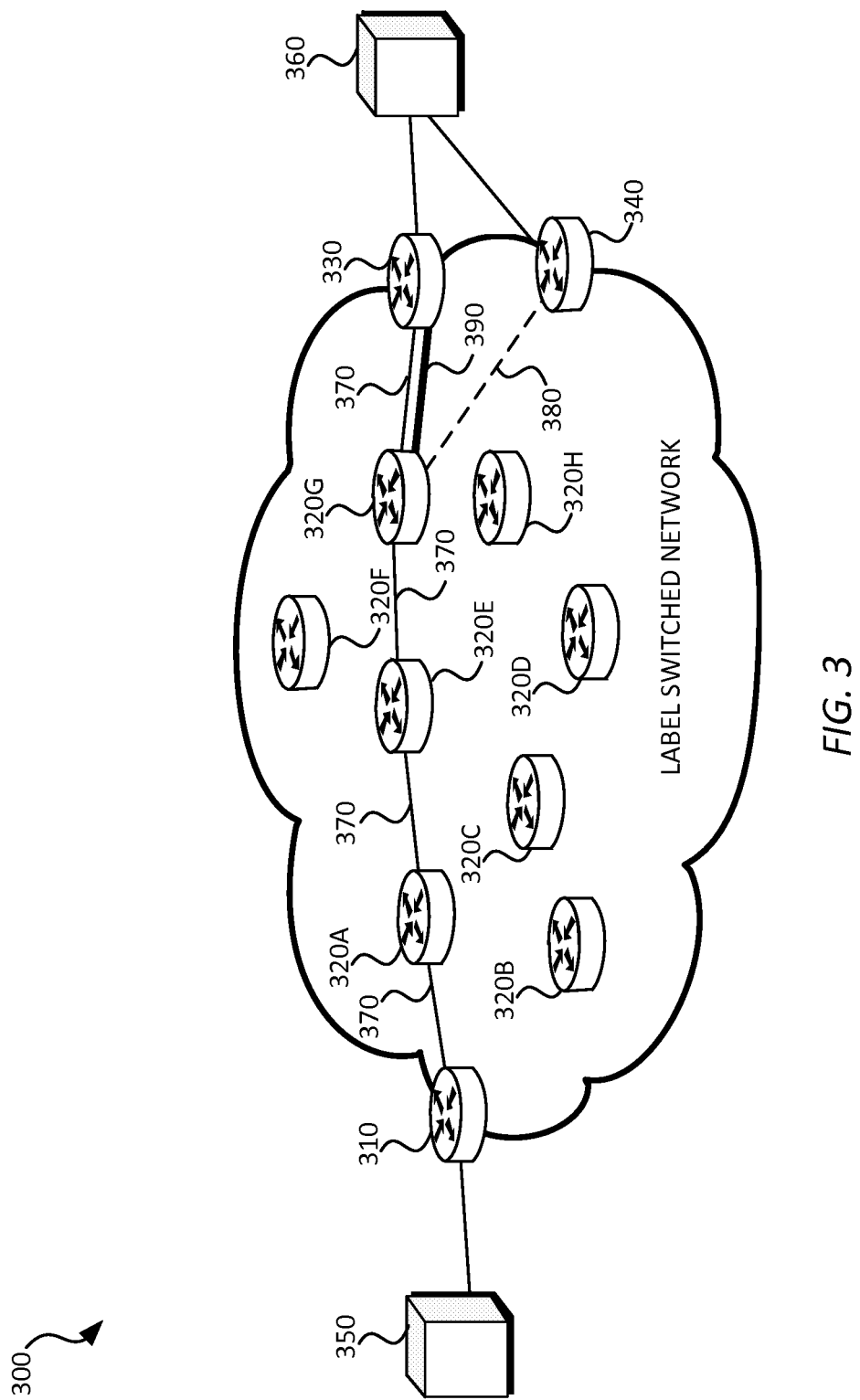
FIG. 3 is a diagram of an embodiment of a protected label switched network.

FIG. 3 is a diagram of an embodiment of a protected label switched network 300. Network 300 comprises an ingress node 310, one or more internal nodes 320, a primary egress node 330, and a backup egress node 340, and in some embodiments is coupled to a source 350, and a destination 360, which may be substantially similar to ingress node 110, internal nodes 120, primary egress node 130, backup egress node 140, source 150, and destination 160, respectively, shown in FIG. 1. Network 300 further comprises a primary LSP 370 that links ingress node 310 to primary egress node 330 for transporting data from source 350 to destination 360. To protect network 300 against a failure of primary egress node 330, in some embodiments network 300 further comprises a backup LSP 380 that links an immediately preceding previous hop (e.g., internal node 320G) of primary egress node 330 with backup egress node 340.

As shown in FIG. 3, in some embodiments backup LSP 380 exists only between internal node 320G and backup egress node 340. In other embodiments, a backup LSP 380 is established between any internal node 320 in primary LSP 370 and backup egress node 340. As such, backup LSP 380 protects network 300 against the failure of primary egress node 330 while utilizing primary LSP 370 for routing in network 300 between ingress node 310 and the internal node 320G. Establishing backup LSP 380 between internal node 320G and backup egress node 340 rather than creating a fully diverse or disjoint backup LSP between ingress node 310 and backup egress node 340 reduces an amount of network resource needed to create a protected network, simplify operation of the protected network, and/or facilitate a rapid network response to protect against egress failure (e.g., restoring delivery of data to destination 360 in about 50 milliseconds). To determine when primary egress node 330 has failed and backup LSP 380 should be used, a BFD session 390 is created between internal node 320G and primary egress node 330. BFD session 390 transmits data packets between internal node 320G and primary egress node 330 periodically and/or on demand to verify primary egress node 330 is functioning properly and has not failed. When BFD session 390 indicates that primary egress node 330 has failed and can no longer deliver data to destination 360 according to primary LSP 370, internal node 320G switches to backup LSP 380 to deliver the data to destination 360 through backup egress node 340.

In an embodiment of network 300, source 350 transmits data to ingress node 310 for delivery to destination 360 via network 300. Ingress node 310 determines primary LSP 370 for the data through network 300 to primary egress node 330 and pushes a label onto the data that describes links between nodes over which the data should be sent and/or nodes in network 300 to which the data should be sent. Ingress node 310 transmits information to the nodes in the network (e.g., nodes along the path determined by ingress node 310)

describing primary LSP 370 for the data through network 300. Each node receiving the information stores the information locally, for example, as one or more entries in a forwarding table.

When or after primary egress node 330 determines a primary service label for the data and transmits a primary service label in a first message (e.g., a Border Gateway Protocol (BGP) message) to ingress node 310, backup egress node 340 determines a backup service label for the data and transmits a backup service label to ingress node 310 in a second message. In addition to the primary service label, the first message contains a route associated with the primary service label, which is used for forwarding the data with the route from primary egress node 330 in network 300 to destination 360 outside of network 300. The first message contains other information associated with the primary service label in some embodiments. For example, for a layer 3 virtual private network (L3VPN) service, the first message contains information such as a route distinguisher (RD) and a route target (RT) for identifying a virtual private network (VPN). For the route associated with the primary service label in the first message, the second message containing the backup service label will comprise the same route and a backup service label, which is used for forwarding the data with the route from backup egress node 340 in network 300 to destination 360 outside of network 300. In some embodiments, the primary service label and the backup service label are the same label. In some embodiments, the primary service label and the backup service label are different labels. The second message contains the information for identifying the service, with such information being the same as information in the first message that is used for identifying the same service. Ingress node 310 determines that the service label in a message is the primary service label from the origin of the message. If the message is from primary egress node 330, which is the egress node of LSP 370, then the service label in the message is the primary service label. Ingress node 310 then combines the primary service label and the backup service label for the same service into an object and inserts the object into a path setup (PATH) message for LSP 370 for transporting the service. This PATH message is transmitted to internal node 320G. In some embodiments, ingress node 310 sends the primary service label and the backup service label for the same service carried by LSP 370 to internal node 320G through a BGP message. In addition to the primary service label and backup service label, the BGP message contains the information for identifying LSP 370.

When primary egress node 330 determines to withdraw the primary service label and the route associated with the primary service label through sending a third message (e.g., a BGP message) to ingress node 310, backup egress node 340 determines to withdraw the backup service label and the route associated with the backup service label through sending a fourth message to ingress node 310. The third message contains the information associated with the primary service label for identifying the service. The fourth message contains the information associated with the backup service label for identifying the same service. After receiving the third message and the fourth message, ingress node 310 then removes the object containing the primary service label and the backup service label from the PATH message for LSP 370 for transporting the service. This updated PATH message is then transmitted to internal node 320G.

In some embodiments, backup egress node 340 determines a backup service label for the data and transmits a backup service label in a message to primary egress node 330. In addition to the backup service label, the message contains a route associated with the backup service label, and information for identifying a service. The backup service label is used for forwarding the data with the route from backup egress node 340 in network 300 to destination 360 outside of network 300. After receiving the backup service label in the message, primary egress node 330 constructs an object comprising the backup service label and a primary service label. The primary service label is associated with the same route and service as the backup service label and is used for forwarding a service data from primary egress node 330 in network 300 to destination 360 outside of network 300. The object is inserted into a path reservation (RESV) message for LSP 370 for carrying the service. The updated RESV message is transmitted to internal node 320G.

Backup egress node 340 determines to withdraw the backup service label with the route through sending a message to primary egress node 330. In addition to the backup service label and the route, the message contains the information for identifying a service. The backup service label is used for forwarding the data with the route from backup egress node 340 in network 300 to destination 360 outside of network 300. After receiving the backup service label in the message, primary egress node 330 removes the object containing the primary service label and the backup service label from the RESV message for LSP 370 for carrying the service. The updated RESV message is transmitted to internal node 320G.

Internal node 320G utilizes the message received from ingress node 310 or primary egress node 330 in providing protection against a failure of primary egress node 330 of LSP 370. To protect against a failure of primary egress node 330, internal node 320G updates a primary-backup service label table (PBSLT) containing a list of pairs of primary service label and backup service label, and establishes BFD session 390 with primary egress node 330. The table is associated with LSP 370. For the message with an inserted object containing a primary service label and backup service label, internal node 320G adds the primary service label and backup service label as a pair into PBSLT. For the message with the removed object containing a primary service label and backup service label, internal node 320G deletes the pair for the primary service label and backup service label from PBSLT. The BFD session 390 is referred to as a single-hop BFD session because it exists between internal node 320G and primary egress node 330 without any intervening nodes. As such, and as shown in FIG. 3, internal node 320G immediately precedes primary egress node 330 in network 300 (e.g., immediately precedes primary egress node 330 according to the sequential path of primary LSP 370 in network 300). Internal node 320G locally protects primary egress node 330 and/or network 300 against failure due to the proximity of internal node 320G to primary egress node 330 in network 300 and the single-hop nature of the protection. Additionally, internal node 320G immediately precedes backup egress node 340 in network 300 (e.g., immediately precedes backup egress node 340 in backup LSP 380 in network 300). Internal node 320G utilizes BFD session 390 to determine whether primary egress node 330 has failed or is operating properly.

When internal node 320G determines, according to BFD session 390, that primary egress node 330 is operating properly, data traffic that includes the primary service label is forwarded to primary egress node 330 according to primary LSP 370. Primary egress node 330 then forwards the data traffic to destination 360 outside of network 300 according to the primary service label.

When internal node 320G determines, according to BFD session 390, that primary egress node 330 has failed and/or is not functioning properly, internal node 320G replaces the primary service label with the backup service label in traffic being received from LSP 370 at internal node 320G and including the primary service label through using the PBSLT associated with LSP 370. After replacing the label, internal node 320G forwards the data traffic to backup egress node 340 according to backup LSP 380. Backup egress node 340 then forwards the data traffic to destination 360 outside of network 300 according to the backup service label.

By detecting a failure of primary egress node 330 and rerouting data traffic to backup egress node 340, internal node 320G protects network 300 from egress failure with a rapid recovery time and limited network resource usage.

Figure 4:
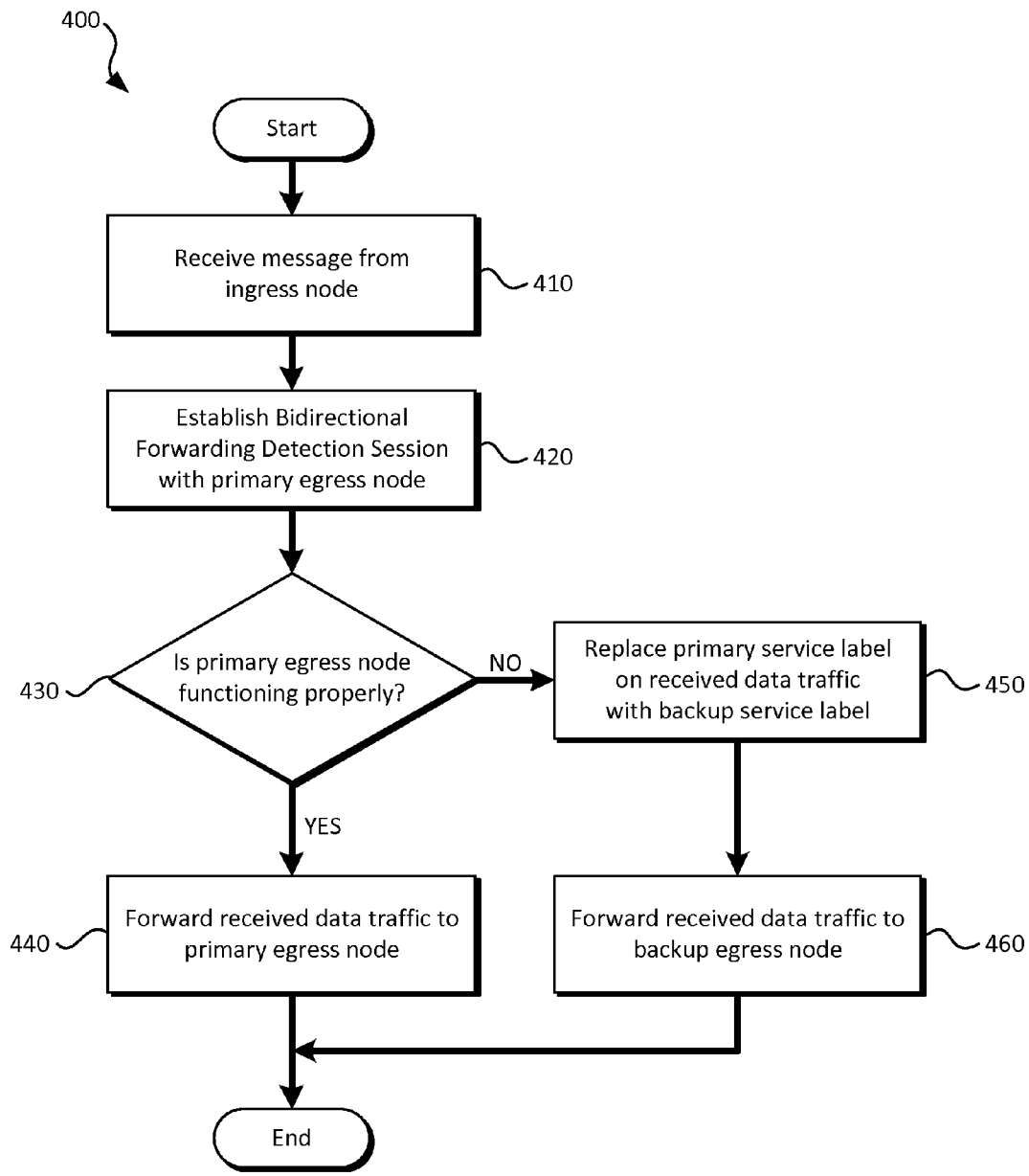
FIG. 4 is a flowchart of an embodiment of a method for providing egress node failure protection in a network.

FIG. 4 is a flowchart of an embodiment of a method 400 for providing egress node failure protection in a network. Method 400 may be implemented in a network element (e.g., network element 200, shown in FIG. 2) that operates in a network (e.g., a label switched network such as network 300, shown in FIG. 3). At step 410, the network element receives a message from an ingress node. The message is, for example, an MPLS PATH or a BGP UPDATE message and comprises a primary service label and a backup service label. The primary service label and a backup service label are determined by a primary egress node and a backup egress node, respectively, and are transmitted to the ingress node to be combined to form a part of the message. Alternatively, the network element receives a message from the primary egress node. For example, the message is an MPLS RESV or a BGP UPDATE message and comprises a primary service label and a backup service label determined by the primary egress node and the backup egress node, respectively.

At step 420, the network element establishes a BFD session with the primary egress node. Establishing the BFD session enables the network element to monitor the primary egress node and have knowledge of a failure of the primary egress node. The BFD session comprises periodically transmitting data packets between the network element and the primary egress node to verify proper operation of the primary egress node. The BFD session further comprises a response indicating that the primary egress node is operating properly. The response is transmitted to the network element when the network element demands the response.

At step 430, the network element determines whether the primary egress node is functioning properly according to the BFD session. If the egress node is functioning properly, at step 440, the network element forwards data traffic received from an upstream node in a primary LSP in the network to the primary egress node. In some embodiments, the data traffic forwarded to the primary egress node comprises the primary service label.

At step 450, if the egress node is not functioning properly, the network element replaces the primary service label that is included in the data traffic with the backup service label. In some embodiments, replacing the service label comprises popping the primary service label off of one or more data packets in the data traffic via a pop operation and pushing the backup service label onto the one or more data packets via a push operation. Alternatively, replacing the service label comprises executing a swap operation. After replacing the primary service label with the backup service label, the network element forwards the data traffic received from an upstream node in the primary LSP in the network to a backup egress node according to a backup LSP at step 460. In some embodiments, the data traffic forwarded to the backup egress node comprises the backup service label.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in an internal node in a network, the method comprising:
    receiving a path reservation (RESV) message from a primary egress node comprising a primary service label associated with the primary egress node and a primary label switched path (LSP) and a backup service label associated with a backup egress node and a backup LSP;
    establishing a bidirectional forwarding detection (BFD) session with the primary egress node, wherein the BFD session indicates a status of the primary egress node;
    forwarding data traffic received from an upstream node in the primary ISP to the primary egress node according to the primary LSP when the BFD session indicates the primary egress node is functioning properly, wherein the data traffic comprises the primary service label;
    forwarding data traffic received from the upstream node in the primary LSP to the backup egress node according to the backup LSP when the BFD session indicates the primary egress node is not functioning properly; and
    replacing the primary service label on the data traffic with the backup service label when the data traffic is forwarded to the backup egress node according to the backup LSP, wherein the backup LSP is established by an internal node,
    wherein receiving the path RESV message comprises receiving the backup service label from the backup egress node, and transmitting the primary service label and the backup service label to the internal node.

2. The method of claim 1, wherein the primary service label is used on the primary egress node for routing the data traffic from the primary egress node to a destination, and wherein the backup service label is used on the backup egress node for routing the data traffic from the backup egress node to the destination.

3. The method of claim 1, wherein the internal node immediately precedes the primary egress node in the primary LSP.

4. The method of claim 1, wherein the BFD session comprises a single-hop connection between the internal node and the primary egress node with no intervening nodes.

5. A network element, comprising:
a receiver configured to:
receive a path reservation (RESV) message from a primary egress node comprising a primary service label and a backup service label in a label switched network; and
receive a data flow from an upstream node in a primary label switched path (LSP) in the network, wherein the data flow is associated with the primary service label;
a processor coupled to the receiver and configured to:
establish a table comprising pairs of the primary service label and the backup service label associated with the primary LSP;
establish a single-hop bidirectional forwarding detection (BFD) session with a primary egress node in the network;
forward the data flow to the primary egress node when the BFD session indicates the primary egress node is functioning;
associate the data flow with the backup service label when the BFD session indicates the primary egress node has failed by popping the primary service label off of one or more data packets in the data flow and pushing the backup service label onto the one or more data packets in the data flow; and
forward the data flow to a backup egress node; and
a transmitter coupled to the processor and configured to:
transmit the data flow to a downstream node in the network in response to a determination by the processor of a location for transmitting the data flow,
wherein receipt of the path RESV messages comprises receiving the backup service label from the backup egress node, and transmitting the primary service label and the backup service label to an internal node.

6. The network element of claim 5, wherein the network element immediately precedes the primary egress node.

7. The network element of claim 5, wherein the network element further comprises a routing table, and wherein the network element protects the network from a failure of the primary egress node via fast re-route according to the table when the BFD session indicates the primary egress node has failed.

8. The network element of claim 5, wherein the network element is a label switched router.

9. A computer program product comprising computer executable instructions stored on a non-transitory computer readable medium such that when executed by a processor cause a network element to protect a label switched network against egress node failure by:
receiving a primary service label and a backup service label in a path reservation (RESV) message from an upstream node in the network;
receiving data traffic comprising the primary service label from the upstream node for transmitting to a downstream node in the network;
determining a status of a primary egress node in the network, the primary egress node being associated with a primary label switching path (LSP);
forwarding the data traffic according to the primary LSP when the primary egress node is operating properly; and
replacing the primary service label with the backup service label and forwarding the data traffic according to a backup LSP when the primary egress node has failed,
wherein receiving the RESV message comprises receiving the backup service label from a backup egress node, and transmitting the primary service label and the backup service label to an internal node.

10. The computer program product of claim 9, wherein determining the status of the primary egress node comprises forming a bidirectional forwarding detection (BFD) session between the network element and the primary egress node.

11. The computer program product of claim 10, wherein the BFD session comprises a single-hop BFD session existing between the network element and the primary egress node, and wherein the network element is immediately upstream from the primary egress node in the network.

12. The computer program product of claim 9, wherein the primary LSP describes a path through the network from an ingress node to the primary egress node, and wherein the backup LSP describes a path through the network from the network element to the backup egress node.

13. The computer program product of claim 12, wherein the primary service label is in a forwarding entry in a forwarding table on the primary egress node and is used for forwarding a data packet with the primary service label from the primary egress node to a destination outside of the network, and wherein the backup service label is in a forwarding entry in a forwarding table on the backup egress node and is used for forwarding a data packet with the backup service label from the backup egress node to the destination outside of the network.

* * * * *